200
United States Patent Office 2,884,387
Patented Apr. 28, 1959

2,884,387

POROUS MEMBRANE MATERIALS AND PROCESS FOR PRODUCING THE SAME

Harold H. Bieber, Union, N.J., and Paul F. Bruins, Douglaston, and Harry Paul Gregor, Hewlett, N.Y., assignors to Polytechnic Institute of Brooklyn No Drawing. Application October 2, 1956
Serial No. 613,377

23 Claims. (Cl. 260—2.5)

This invention relates to novel compositions of matter. More particularly, the invention contemplates the provision of new and improved membrane materials or membranaceous compositions of controlled microporosity useful as electrode separators within batteries and for similar applications.

The principal requisites of a battery separator of the general class described as used in conventional type lead acid storage batteries or any of the alkaline electrolyte type batteries, are maximum chemical stability and a low electrical resistance for maximum diffusion of electrolyte in order to minimize the internal resistance of the over-all assembly. Other necessary properties include, sufficient mechanical strength to withstand handling during assembly of the battery, shape or dimensional stability when wet with electrolyte, and sufficient density to resist piercing of the separator and possible short circuiting of the cell under action of metallic growths.

Heretofore, separators for alkaline batteries have been formed of cellulosic or modified cellulosic type materials. For example, United States Patent No. 2,317,711 as issued on April 27, 1943, to Henri G. Andre, and entitled "Accumulator," discloses a secondary battery in which the positive active plate is formed of a substance such as silver oxide, silver peroxide, or combinations thereof, whereas the negative plate is formed of zinc, and separation of the respective electrodes is effected by wrapping the positive plate within a membrane of regenerated cellulose. While the use of cellulose or modified cellulosic materials as separators for alkaline electrolyte batteries is satisfactory initially, it has been found in general that such substances tend to breakdown upon extended exposure to standard alkaline electrolytes, and, in the silver-zinc cell, due to the oxidizing nature of the positive electrode. As a result, the separator loses its initial insulating properties and is pierced readily by the growth or "treeing" of the metallic components, thereby severely limiting the life cycle of a secondary battery of this type.

The use of microporous polymeric films as battery separators has also been practiced heretofore. For example, the manufacture of such films is disclosed in United States Patents Nos. 2,542,527, issued on February 20, 1951, to Honey et al. and entitled, "Process of Producing Microporous Material," and 2,676,929, issued on April 27, 1954, to Joseph C. Duddy and entitled, "Stock Material for Microporous Articles and Methods of Making the Same From Starch and Polyethylene." In these patented processes, polymeric materials such as polyvinyl chloride or polyethylene are admixed with finely-ground starch particles and the mixture cast into sheets. Thereafter, by successive treatments and washing in both acid and alkaline media the starch particles are hydrolyzed and rendered soluble, leaving in their place voids of the approximate size of the original particles. While this type of microporous material has found commercial application in the lead acid battery, the nickel-cadmium battery, and the mercury-zinc cell, among others, its principal disadvantages are the relatively high cost of manufacture, the difficulty experienced during manufacture in maintaining close control of the pore size in the finished product, and the inability of the process to achieve pores of the order of 1000–2000 A. which are desirable in certain battery applications as, for example, in the silver peroxide-zinc alkaline cell.

Various techniques for incorporating ion exchange resins into membranaceous sheet form have also been proposed heretofore. These are described in United States Patents Nos. 2,614,976 of October 21, 1952, to Patnode et al., entitled, "Electrode for Determining Cationic Activity"; 2,681,319 of June 15, 1954, to George W. Bodamer for "Permselective Films of Anion-Exchange Resins"; and 2,681,320 of June 15, 1954, to George W. Bodamer for "Permselective Films of Cation-Exchange Resins." The techniques employed in accordance with these patents involve either molding of the ion exchange resin and a binder using elevated temperatures and pressures, or sheeting-out of an inert plastic binder on a heated roller mill with mixing of the ion exchange resin particles being effected under continuous milling until the mixture is uniform. In general, the disadvantages of the membranes formed by these processes are their relatively high electrical resistance and the relatively low resin to binder ratio which can be obtained.

It is the principal object of the present invention to provide relatively low cost separator materials of enhanced physical and operational characteristics, that is, materials of low electrical resistance and controlled pore size and pore size distribution which will permit free diffusion of electrolyte while mechanically screening metallic ions from the active material, thereby preventing their passage from a plate of one polarity to the plate of opposite polarity; materials which are formed of inert components such that the separator membranes are highly resistant to strong acid, strong base, and potent oxidizing environments; and materials which further possess such mechanical and physical properties as to greatly facilitate the assembling of battery structures.

In brief, the separators of our invention comprise a chemically inert membrane consisting of a film-forming polymeric matrix having a finely-divided, solid, non-ion-selective hydrophilic polymer dispersed therein, or a finely-divided solid hydrophilic polymer having ionizable groups which are strongly acidic, weakly acidic, strongly basic, weakly basic, or combinations of such groups. The controlled microporous properties of the separators of the invention are obtained through use of a hydrophilic polymer in conjunction with the introduction of porosity into the matrix or film-forming polymer, per se, as explained more fully hereinafter.

In forming the separator membranes of the invention, the selected film-forming polymer is mixed with a suitable solvent medium of at least limited solubility, and, thereafter, there is added to the polymer solution the desired proportion of the selected hydrophilic polymer in finely-divided form, and the mixture is stirred until a uniform suspension is obtained. The resulting slurry may then be cast into a membrane by any conventional procedure such, for example, as by means of a doctor blade, spraying, dip coating or spinning. Any suitable reinforcing material may be incorporated within the membrane to give the end-product added strength. For example, in forming separator membranes for use in batteries employing an alkaline electrolyte, a woven or nonwoven nylon cloth may be cast into the membrane for such purpose, whereas separators for use in acid media may include reinforcing materials of the type of glass fiber, etc. Similar reinforcing fibers such as "Saran" (polyvinylidene chloride), "Teflon" (polytetrafluoroethylene) and "Kel-F" (polytrifluoromonochloroethylene) (trademarks), which are inert with respect to the electrolyte in which the separators are to be used, are also effective for the purpose intended.

The physical structure, pore size and pore size distribution of the resulting membrane are controlled or regulated by proper selection of drying and coagulating conditions employed for solvent elimination. The solvent may be removed by partial drying at temperatures within the range 45° C.–95° C., followed by immersion within a suitable coagulating bath. In essence, we have found that the size and number of pores are related to the solids to solvent ratio, in that, the higher this ratio prior to coagulation of the film, the smaller is the average resulting pore diameter, and, in turn, the higher the drying temperature and the longer the exposure at such temperatures prior to coagulating a membrane, the smaller will be the resulting pores in the membrane.

The membranes of the invention are flexible, microporous in structure, and chemically resistant to strong acids and/or bases as well as oxidizing agents. Their low electrical resistance is derived, in part, from the presence therein of the hydrophilic polymer components. That is to say, these finely-divided hydrophilic particles, uniformly distributed and firmly held within the polymeric matrix, are capable of soaking up electrolyte solution which serves to increase the conductivity of the membranaceous separators by permitting diffusion of the electrolyte through the separator while at the same time serving as a chemically inert isolating barrier. As pointed out hereinbefore, additional porosity may be obtained, if desired, by control of the coagulation and solvent leaching step. In the case of the ion-selective membranes of the invention, apart from the aforementioned mechanical screening of metallic ions, there further exists the possibility of chelating the ions to prevent migration between electrodes.

The expedient for obtaining a microporous structure, similar to that present in a cellulosic membrane, by the use of finely-divided hydrophilic polymer particles dispersed within a chemically stable microporous polymer matrix, results in a low cost battery separator material superior to any known heretofore. Since the finely-divided hydrophilic polymer particles, which function to impart the low resistance properties to an otherwise non-conductive polymer matrix, are firmly enmeshed within the matrix, the low electrical resistance characteristics and the ability of the separator to prevent the formation of "trees" are lasting features of the improved compositions of the invention.

The components used within the separators of the invention, i.e., both the polymeric matrix material and the finely-divided hydrophilic material, must be chemically stable in strong acids, strong bases, and oxidizing environments. For optimum results, we have found that the polymeric matrix material should exhibit solubility to the extent of at least five percent (5%) within a solvent system which is, in turn, at least slightly soluble in the coagulating media, if such is used. Polymer materials which we have found to be possessed of the general requirements for the matrix include polyvinyl chloride, polyvinyl butyral, and copolymers of vinyl chloride and other monomers such as vinyl acetate, vinylidene chloride and acrylonitrile. Suitable solvents include methyl ethyl ketone, methyl isobutyl ketone, acetone, cyclopentanone, dimethyl formamide, and the Cellosolves (trademark—ethylene glycol monoethyl ether and various derivatives thereof) and Carbitols (trademark—diethylene glycol monoethyl ether and various derivatives thereof).

Hydrophilic polymers which can be employed in the production of separators according to the invention include polyvinyl alcohol, polyvinyl pyrrolidone, water-soluble gums such as gum karaya, and polyacrylamide. Suitable hydrophilic polymers of the type containing ionizable groups include such crosslinked resins of the strong acid type as polystyrene sulfonic acid and phosphonic acid; resins of the weak acid type such as polyacrylic acid; resins of the strong base type such as polymeric base materials containing quaternary ammonium groups; resins of the weak base type such as the weak base polyamines; and materials containing both acidic and basic groups such, for example, as polyglycine.

If a more flexible film is necessary or desirable, conventional vinyl plasticizers of the non-ester type as, for example, high molecular weight aromatic hydrocarbons, may be added in small proportions.

The ratio of hydrophilic resin to polymer matrix material used in the compositions of the invention may be varied to some extent. We have found that a ratio of three hundred (300) parts of hydrophilic polymer per one hundred (100) parts of matrix material results in a membrane having ideal properties for use in a battery of the silver-zinc alkaline type. Membranes having a ratio greater than four parts hydrophilic polymer to each part of matrix material do not exhibit suitable mechanical strength, whereas ratios below one to one result in membranes having higher electrical resistance than can be tolerated in battery separators for good operational efficiency. Of course, in applications in which the electrical resistance of the membrane is not an important consideration, as, for example, chemically inert dialyzing membranes and the like, ratios below one to one may be employed in the production of membranes which are ideally suited for such applications. In point of fact, by reason of the porosity obtainable in the polymeric matrix substances through control of the coagulation and solvent leaching steps of the process of the invention, one may obtain porous structures useful for certain applications even in the absence of any hydrophilic polymer component within the structures.

It is believed that the invention may be best understood by reference to the following specific examples of typical preparations of separator membranes and applications of the same:

*Example I*

A matrix material consisting of a 50–50 copolymer of vinyl chloride and acrylonitrile (Bakelite NYGL resin), in amount of four and one-half parts, was dissolved in 25.5 parts of dimethyl formamide. To this solution there were added, 13.5 parts of finely-ground (—200 mesh) polyvinyl alcohol (Elvanol 51–05, trademark—a low-viscosity, partially hydrolyzed grade of polyvinyl alcohol), and 56.5 parts of dimethyl formamide. The resulting mixture was stirred to obtain a homogeneous slurry. After the mixture was permitted to stand for at least fifteen (15) minutes to deaerate (but not longer than 8 hours because of an increasing viscosity), the membrane was formed by coating a flat surface with a uniform thickness (6 to 20 thousandths of an inch) of the slurry, and, thereafter, the solvent was removed by immersing the coated plate into a running water bath maintained at approximately room temperature. The solvent leaching was continued for a minimum of ten (10) minutes, after which the film was removed and dried.

The foregoing membrane, at 8 mils thickness, has an electrical resistance of 10–20 milliohms per square inch when saturated with thirty-one percent (31%) potassium hydroxide. The average effective pore diameter present, as calculated from liquid permeability data, is of the order of 2000 A. It is ideally suited for use in batteries for purposes of isolating adjacent positive and negative plates. For example, when the material was wrapped around a silver peroxide electrode in order to isolate it from a zinc electrode, the life of this alkaline system on cycling was extended by at least a factor of two hundred percent (200%) when compared to similar electrode components wrapped with commercial cellulosic separator material.

*Example II*

A matrix material consisting of a 50–50 copolymer of vinyl chloride and acrylonitrile, in amount of four and one-half parts, was dissolved in 25.5 parts of dimethyl formamide. To this solution there were added 13.5 parts of finely-ground (—100 mesh) polyvinyl alcohol, and 56.5 parts of dimethyl formamide, to obtain a uniform or homogeneous suspension. An open weave nylon marquisette of approximately 5 mils thickness was passed through the slurry and then through a pair of stainless steel stationary rollers set a fixed distance apart (7 mils). The solvent was then removed by immersing the doctored film in a water for ten (10) minutes with the formation of a flexible reinforced membrane. The separator material was finished by drying at a temperature below 60° C. to remove the water.

*Example III*

The procedure described in Example I was repeated with polyvinyl butyral (Celonese PX–5 or Bakelite XYHL) being employed as the film forming material. This was accomplished by dissolving 8 parts of the polyvinyl butyral in 92 parts of ethylene glycol monoethyl ether (Cellosolve), and thereafter adding 24 parts of 200 mesh polyvinyl alcohol (Elvanol 51–05) with strong stirring. Thereafter, 32 parts of Cellosolve were used to thin the resulting slurry to a proper consistency for casting. The formation of the membrane was effected in exactly the same manner as previously described in Example I.

*Example IV*

One part of a polymer matrix material consisting of a 50–50 copolymer of vinyl chloride and acrylonitrile (Bakelite NYGL) was dissolved in six parts of dimethyl formamide. To this mixture there was added one part of water soluble karaya gum (hydrophil 1150—a grade of pure karaya gum marketed by Morningstar-Nicol) of —200 mesh, and the mixture was stirred to a uniform slurry. The film was cast as described in Example I, and the solvent removed to the extent of porosity desired in the final product, either by complete evaporation, or by partial evaporation followed by coagulation in a non-aqueous solvent such as methanol. A flexible, strong film was obtained which swells in electrolyte to impart low electrical resistance characteristics to the material.

*Example V*

Sixty-four and one-half (64½) parts of Bakelite resin NYGL (a 50–50 copolymer of vinyl chloride and acrylonitrile), previously dissolved in dimethyl formamide to form a fifteen percent (15%) solution, and 19.4 parts of a weak base polyamine resin (Rohm & Haas XE–114, a weak base ion exchange resin based on one to two percent crosslinked polystyrene which has been chloromethylated and then condensed with an alkalene polyamine such as tetraethylene pentamine or other primary or secondary amine; —200 mesh), which was previously soaked in 61.4 parts of dimethyl formamide for a period of at least four hours, were mixed together to obtain a uniform or homogeneous slurry. Soaking of the resin in dimethyl formamide was practiced to swell the same prior to admixture with the binder, thereby insuring a relatively constant slurry viscosity for long periods of time.

The foregoing slurry was cast by extruding a 10 mil quantity onto a glass plate. Following the casting, the resulting membrane was dried at 40–45° C. until the surface of the film became dull (7–10 minutes). The membrane was then placed in a running water coagulating bath for at least ten minutes.

The membrane was tested as a separator for the silver peroxide-zinc alkaline cell and gave at least a two hundred percent (200%) improvement in cycle life as compared to the performance of a cellulosic membrane.

*Example VI*

The procedure described in Example V was modified by use of a carboxylic acid-type resin (Rohm & Haas IRC–50, a weak acid ion exchange resin of a cross-linked copolymer of methacrylic acid and divinyl benzene, containing between 4 and 10 mol percent of divinyl benzene). The slurry used in forming the casting was made up of 63.0 parts of the fifteen percent (15%) solution of Bakelite NYGL resin in dimethyl formamide admixed with 24.0 parts of the carboxylic acid resin (—200 mesh). Prior to use, the ion exchange resin was mixed with 80.0 parts of dimethyl formamide was allowed to soak for at least four hours.

The slurry was cast on a flat plate (10 mils) and then dried at 90–100° C. for a period of three to five minutes. This was followed by a coagulation and solvent leaching in running water.

The foregoing membrane was also tested as a separator for the silver peroxide-zinc alkaline cell and demonstrated a three hundred percent (300%) improvement in cycle life as compared to the equivalent testing of a cellulosic membrane.

The foregoing procedure was repeated with strong acid type resins including Phosphonic resin (National Aluminate Corp.—an intermediate strength acid ion exchange resin derived from crosslinked polystyrene, substituted on the benzene nucleus with phosphonic acid groups) and Dowex 50 (Dow Chemical Company—a strong acid ion exchange resin derived from crosslinked polystyrene by sulphonation of the benzene nucleus—the degree of crosslinking being about 10 percent), and equivalent results were obtained upon testing of the resulting membranes.

The foregoing procedure was also repeated with a strong base-type ion exchange resin (Dowex 1 a strong base-type ion exchange resin derived from a copolymer of styrene and 4 to 10 mol percent of divinyl benzene, chloromethylated and treated with trimethyl amine) and equivalent results obtained with the resulting membrane.

*Example VII*

Seven and one-half (7½) parts of a polymeric matrix material consisting of polyvinyl butyral (Bakelite XYHL—a partial butyral of polyvinyl alcohol containing about 81 percent vinyl butyral resin and 19 percent vinyl alcohol resin in the same molecule; or Celanese PX–5 which is chemically equivalent to Bakelite XYHL but of lower molecular weight; or Celanese PX–2 which is also chemically equivalent to Bakelite XYHL but of still lower molecular weight) were dissolved in 70 parts of ethylene glycol monoethyl ether (Cellosolve). To this solution there were added 22.5 parts of a finely-ground (—200 mesh) polystyrene sulfonic acid resin (Dowex 50), and 0.5 part of a vinyl plasticizer (Mobilsol C or Sovaloid C, highly aromatic oils consisting chiefly of methyl naphthalenes having a boiling point range of 400 to 730° F. with the major fraction boiling at 700° F.). The resulting mixture was stirred to obtain a uniform suspension, and the slurry was deaerated and cast into sheet form. The solvent was partially evaporated by subjecting the film to drying conditions in an oven maintained at 90–100° C. for a period of two to five minutes. The solvent remaining following evaporation drying was removed by immersing the wet film in a coagulating bath of running water. The resulting membrane exhibited excellent properties for use as a battery separator.

The foregoing procedure was repeated with the following resins and a satisfactory membrane was obtained in each instance:

(1) A weak base resin (Rohm & Haas XE–114);
(2) A strong base resin (Dowex 1); and
(3) A weak acid-type ion exchange resin of the cross-linked polyacrylic acid-type (IRC–50).

*Example VIII*

Twenty-four (24) parts of a finely-divided (—200 mesh) carboxylic acid resin (Rohm & Haas IRC–50), which had been soaked in eighty (80) parts of dimethyl formamide for at least four hours, were stirred into sixty-three (63) parts of a fifteen percent (15%) solution of Bakelite NYGL resin dissolved in dimethyl formamide. The mixture was stirred until a smooth, homogeneous slurry was obtained. An open weave nylon marquisette was passed through the slurry and then through a pair of stainless steel rollers spaced a fixed distance apart. The solvent was removed by immersing the doctored reinforced film in a water bath to form a flexible-reinforced membrane of excellent separator characteristics.

Having thus described the subject matter of our invention, what it is desired to secure by Letters Patent is:

1. A membranaceous composition that comprises, a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having a finely-divided solid hydrophilic polymeric material, which is characterized by the ability to swell in water and aqueous solutions, uniformly dispersed therethrough and firmly held therein, the polymeric matrix material and hydrophilic polymeric material being present in respective proportions within the range of from 1 to 4 parts hydrophilic material to each part matrix material.

2. A membranaceous body that comprises, a substantially inert synthetic fibrous reinforcing material contained within a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having a finely-divided solid hydrophilic polymeric material, which is characterized by the ability to swell in water and aqueous solutions, uniformly dispersed therethrough and firmly held therein, the polymeric matrix material and hydrophilic polymeric material being present in respective proportions within the range of from 1 to 4 parts hydrophilic material to each part matrix material.

3. A membranaceous composition that comprises, a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having uniformly dispersed therethrough and firmly held therein, a finely-divided, solid, non-ion-selective hydrophilic material characterized by the ability to swell in water and aqueous solutions and selected from the group consisting of polyvinyl alcohol, polyvinyl pyrollidone, polyacrylamide and water-soluble natural gums; the polymeric matrix material and hydrophilic material being present in respective proportions within the range of from 1 to 4 parts hydrophilic material to each part matrix material.

4. A membranaceous body that comprises, a substantially inert synthetic fibrous reinforcing material contained within a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having uniformly dispersed therethrough and firmly held therein, a finely-divided solid non-ion-selective hydrophilic material characterized by the ability to swell in water and aqueous solutions and selected from the group consisting of polyvinyl alcohol, polyvinyl pyrollidone, polyacrylamide and water-soluble natural gums; the polymeric matrix material and hydrophilic material being present in respective proportions within the range of from 1 to 4 parts hydrophilic material to each part matrix material.

5. A membranaceous composition that comprises, a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having uniformly dispersed therethrough and firmly held therein, a finely-divided, solid, ion-selective, cross-linked hydrophilic polymeric material characterized by the ability to swell in water and aqueous solutions; the polymeric matrix material and hydrophilic polymeric material being present in respective proportions within the range of from 1 to 4 parts of hydrophilic material to each part matrix material.

6. A membranaceous body that comprises, a substantially inert synthetic fibrous reinforcing material contained within a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having uniformly dispersed therethrough and firmly held therein, a finely-divided, solid, ion-selective, crosslinked hydrophilic polymeric material characterized by the ability to swell in water and aqueous solutions; the polymeric matrix material and hydrophilic polymeric material being present in respective proportions within the range of from 1 to 4 parts hydrophilic material to each part matrix material.

7. A membranaceous chemically stable composition of low electrical operating resistance for use as an electrode separator within batteries of the types utilizing acid and alkaline electrolytes that comprises, a microporous film-like polymeric matrix consisting of a copolymer of polyvinyl chloride and acrylonitrile having uniformly dispersed therethrough and firmly held therein, finely-divided solid particles of polyvinyl alcohol; the polymeric matrix and polyvinyl alcohol being present in respective proportions within the range of from 1 to 4 parts polyvinyl alcohol to each part matrix.

8. A membranaceous chemically stable body of low electrical operating resistance for use as an electrode separator within batteries of the types utilizing acid and alkaline electrolytes that comprises, a reinforcing member consisting of a substantially inert synthetic fibrous material contained within a microporous film-like polymeric matrix consisting of a copolymer of polyvinyl chloride and acrylonitrile, said matrix having uniformly dispersed therethrough and firmly held therein, finely-divided solid particles of polyvinyl alcohol; the polymeric matrix and polyvinyl alcohol being present in respective proportions within the range of from 1 to 4 parts polyvinyl alcohol to each part matrix.

9. A membranaceous chemically stable composition of low electrical operating resistance for use as an electrode separator within batteries of the silver-zinc alkaline electrolyte type that comprises, a microporous film-like polymeric matrix consisting of a copolymer of polyvinyl chloride and acrylonitrile having uniformly dispersed therethrough and firmly held therein, finely-divided solid particles of a crosslinked copolymer of methacrylic acid and divinyl benzene; the polymeric matrix and crosslinked copolymer being present in respective proportions within the range of from 1 to 4 parts crosslinked copolymer to each part matrix.

10. A membranaceous chemically stable body of low electrical operating resistance for use as an electrode separator within batteries of the silver-zinc alkaline electrolyte type that comprises, a reinforcing member consisting of a substantially inert synthetic fibrous material contained within a microporous film-like polymeric matrix consisting of a copolymer of polyvinyl chloride and acrylonitrile, said matrix having uniformly dispersed therethrough and firmly held therein, finely-divided solid particles of a crosslinked copolymer of methacrylic acid and divinyl benzene; the polymeric matrix and crosslinked copolymer being present in respective proportions equal to approximately 300 parts of crosslinked copolymer per 100 parts of matrix.

11. A membranaceous chemically stable composition of low electrical operating resistance for use as an electrode separator within batteries of the nickel-cadmium type that comprises, a microporous film-like polymeric matrix consisting of a copolymer of polyvinyl chloride and acrylonitrile having uniformly dispersed therethrough and firmly held therein, a finely-divided, solid, crosslinked hydrophilic polymeric material characterized by the ability to swell in water and aqueous solutions and consisting of a weak base polyamine type ion exchange resin; the polymeric matrix and crosslinked exchange resin being present in respective proportions within the range of from 1 to 4 parts crosslinked resin to each part matrix.

12. A membranaceous chemically stable composition of low electrical operating resistance for use as an electrode separator within batteries of the lead-acid type that comprises, a microporous film-like polymeric matrix consisting of a copolymer of polyvinyl chloride and acrylonitrile having uniformly dispersed therethrough and firmly held therein, a finely-divided, solid, crosslinked hydrophilic polymeric material characterized by the ability to swell in water and aqueous solutions and consisting of a strong acid type ion exchange resin; the polymeric matrix and crosslinked exchange resin being present in respective proportions within the range of from 1 to 4 parts crosslinked resin to each part matrix.

13. A membranaceous chemically stable composition of low electrical operating resistance for use as an electrode separator within batteries of the lead-acid type that comprises, a microporous film-like polymeric matrix consisting of a copolymer of polyvinyl chloride and acrylonitrile having uniformly dispersed therethrough and firmly held therein, a finely-divided, solid, crosslinked hydrophilic polymeric material characterized by the ability to swell in water and aqueous solutions and consisting of a polystyrene sulfonic acid ion exchange resin; the polymeric matrix and crosslinked exchange resin being present in respective proportions within the range of from 1 to 4 parts crosslinked resin to each part matrix.

14. A membranaceous chemically stable composition of low electrical operating resistance for use as an electrode separator within batteries of the lead-acid type that comprises, a microporous film-like polymeric matrix consisting of a copolymer of polyvinyl chloride and acrylonitrile having uniformly dispersed therethrough and firmly held therein, a finely-divided, solid, crosslinked hydrophilic polymeric material characterized by the ability to swell in water and aqueous solutions and consisting of a polystyrene phosphonic acid ion exchange resin; the polymeric matrix and crosslinked exchange resin being present in respective proportions within the range of from 1 to 4 parts crosslinked resin to each part martix.

15. A membranaceous chemically stable composition of low electrical operating resistance for use as an electrode separator within batteries of the lead-acid type that comprises, a microporous film-like polymeric matrix consisting of a copolymer of polyvinyl chloride and acrylonitrile having uniformly dispersed therethrough and firmly held therein, a finely-divided, solid, crosslinked hydrophilic polymeric material characterized by the ability to swell in water and aqueous solutions and consisting of a strong base type ion exchange resin; the polymeric matrix and crosslinked exchange resin being present in respective proportions within the range of from 1 to 4 parts crosslinked resin to each part matrix.

16. A membranaceous composition that comprises, a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix containing a small proportion of a flexibilizing agent in the form of a high molecular weight aromatic hydrocarbon vinyl plasticizer; and having a finely-divided solid hydrophilic material, which is characterized by the ability to swell in water and aqueous solutions, uniformly dispersed therethrough and firmly held therein, the polymeric matrix material and hydrophilic polymeric material being present in respective proportions within the range of from 1 to 4 parts hydrophilic material to each part matrix material.

17. A membranaceous composition that comprises, a microporous film-like polymeric matrix formed of a material selected from the group consisting of polyvinyl chloride, polyvinyl butyral, and copolymers of vinyl chloride with monomers selected from the group consisting of vinyl acetate, vinylidene chloride and acrylonitrile; said matrix having a finely-divided solid hydrophilic polymeric material, which is characterized by the ability to swell in water and aqueous solutions, uniformly dispersed therethrough and firmly held therein, the polymeric matrix material and hydrophilic polymeric material being present in respective proportions equal to less than one part hydrophilic material to each part matrix material.

18. A membranaceous composition that comprises, a microporous sheet-like polymeric membrane formed of a material selected from the group consisting of polyvinyl chloride, polyvinyl butyral, and copolymers of vinyl chloride with monomers selected from the group consisting of vinyl acetate, vinylchloride and acrylonitrile; said membrane being produced by casting said polymeric material into sheet-form while in admixture with a suitable solvent for the polymeric material selected from the group consisting of methyl ethyl ketone, methyl isobutyl ketone, acetone, cyclopentanone, dimethyl formamide, glycolmonoethylether, and diethylene glycolmonoethylether and thereafter effecting controlled elimination of said solvent from the cast-sheet by leaching to provide a microporous structure.

19. A membranaceous composition that comprises, a microporous sheet-like polymeric membrane, formed of a polymeric matrix material selected from the group consisting of polyvinyl chloride, polyvinyl butyral, and copolymers of vinyl chloride with monomers selected from the group consisting of vinyl acetate, vinylidene chloride and acrylonitrile, and having a finely-divided solid hydrophilic polymeric material, which is characterized by the ability to swell in water and aqueous solutions, uniformly dispersed therethrough and firmly held therein; said membrane being produced by casting said polymeric matrix material and hydrophilic polymeric material into sheet-form while in admixture within a suitable solvent for the matrix material selected from the group consisting of methyl ethyl ketone, methyl isobutyl ketone, acetone, cyclopentanone, dimethyl formamide, glycolmonoethylether, and diethylene glycolmonoethylether, and thereafter effecting controlled elimination of said solvent from the cast-sheet by preliminary partial drying of the same at a temperature within the range 45–95° C., followed by leaching of the cast-sheet under conditions controlled to effect removal of the remaining solvent while avoiding removal of any appreciable portion of the hydrophilic polymeric material contained therein.

20. In a process for the production of a polymeric membrane for use as a battery electrode separator material, the improvement that comprises imparting combined low electrical operating resistance and microporosity to the membrane by permanently incorporating finely-divided, solid particles of a hydrophilic polymeric material characterized by the ability to swell within water and aqueous solutions, within a membranaceous matrix formed of a material selected from the group consisting of polyvinyl chloride, polyvinyl butyral, and copolymers of vinyl chloride with monomers selected from the group consisting of vinyl acetate, vinylidene chloride and acrylonitrile; said hydrophilic polymeric material and matrix material being admixed within a solvent system of at least limited solubility with respect to the matrix material, and the mixture then cast into membrane form, with elimination of said solvent from the cast-membrane being effected by a leaching operation controlled to avoid removal of any appreciable portion of the hydrophilic polymeric material contained therein.

21. Process for the production of a microporous membranaceous composition that comprises, admixing a film-forming polymeric matrix material selected from the group consisting of polyvinyl chloride, polyvinyl butyral, and copolymers of vinyl chloride with monomers selected from the group consisting of vinyl acetate, vinylidene chloride and acrylonitrile, within a solvent system of at least limited solubility with respect to said matrix material; incorporating finely-divided, solid particles of a hydrophilic polymeric material which is characterized by the ability to swell in water and aqueous solutions, within said mixture of solvent and matrix material to form a uniform suspension of the hydrophilic polymeric material within the matrix material; subjecting the mixture of polymeric materials to a sheet-forming operation; and curing the sheeted mixture by leaching the same for a period of time sufficient to effect elimination of said solvent and the introduction of micropores into said matrix material while avoiding the removal of any appreciable portion of the hydrophilic polymeric material suspended within said matrix material.

22. Process for the production of a microporous membranaceous composition that comprises, admixing a film-forming polymeric matrix material selected from the group consisting of polyvinyl chloride, polyvinyl butyral, and copolymers of vinyl chloride with monomers selected from the group consisting of vinyl acetate, vinylidene chloride and acrylonitrile, within a solvent system of at least limited solubility with respect to said matrix material; incorporating finely-divided, solid particles of a hydrophilic polymeric material which is characterized by the ability to swell in water and aqueous solutions, within said mixture of solvent and matrix material to form a uniform suspension of the hydrophilic polymeric material within the matrix material; subjecting the mixture of polymeric materials to a sheeting operation; and subjecting the sheeted mixture to a leaching operation for a period of time sufficient to effect elimination of said solvent and the introduction of micropores into said matrix material while avoiding the removal of any appreciable portion of the hydrophilic polymeric material suspended within said matrix material.

23. The process as defined within claim 22, wherein the polymeric matrix material is soluble to the extent of at least five percent (5%) within the solvent system, which is in turn at least slightly soluble within the leaching medium; the leaching operation being controlled for control of pore size and pore size distribution within the membranaceous composition.

References Cited in the file of this patent

UNITED STATES PATENTS

| | | |
|---|---|---|
| 2,504,208 | Locke et al. | Apr. 18, 1950 |
| 2,542,527 | Honey et al. | Feb. 20, 1951 |
| 2,700,694 | Fernald | Jan. 25, 1955 |